(No Model.)
C. F. WOESSNER.
DEVICE FOR CLEANING BOTTLES OR SIMILAR RECEPTACLES.
No. 481,537. Patented Aug. 23, 1892.
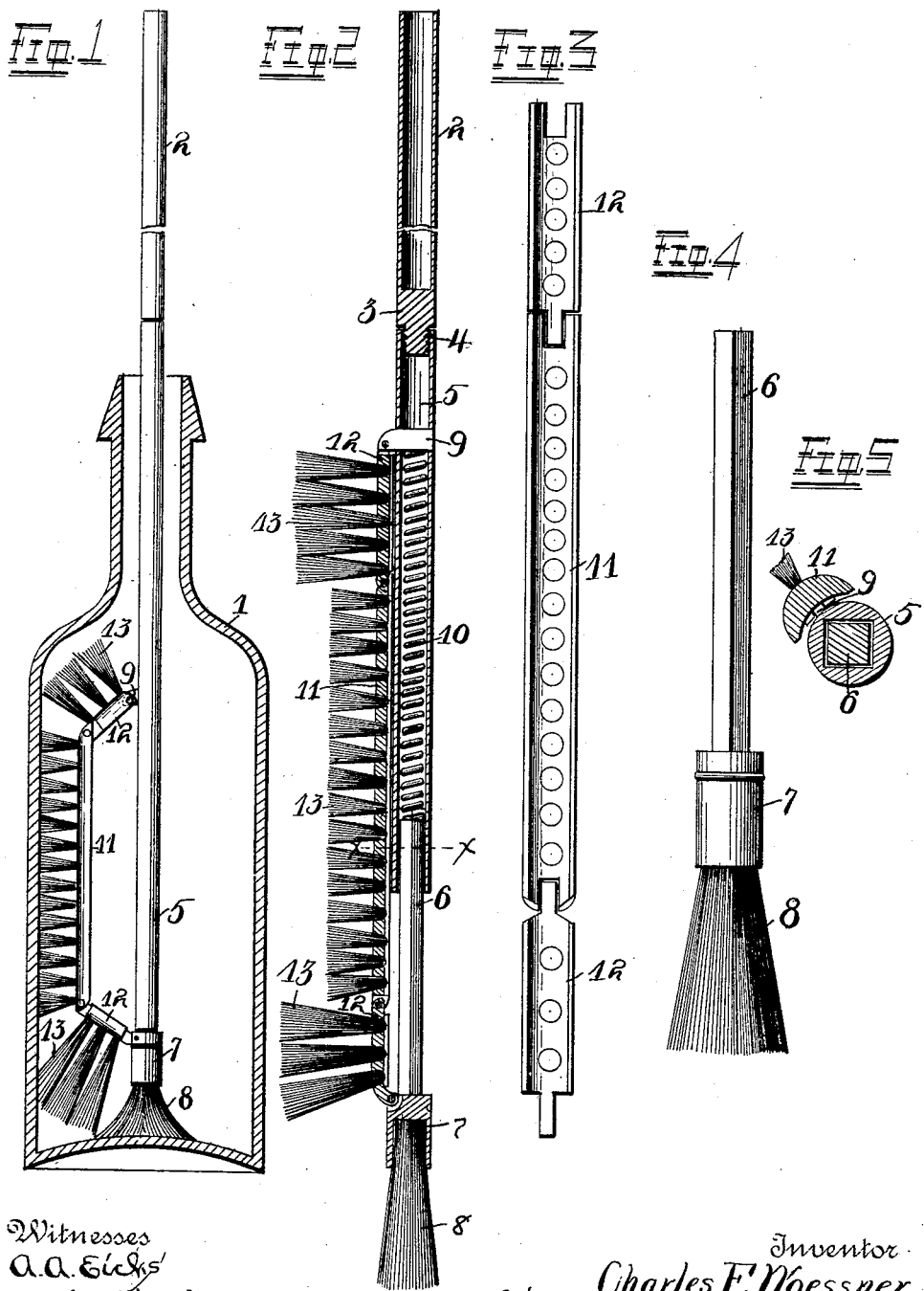
Witnesses
A. A. Eicks
C. F. Keller
Inventor
Charles F. Woessner
By his Attorneys
Higdon Higdon & Longan

UNITED STATES PATENT OFFICE.

CHARLES F. WOESSNER, OF ST. LOUIS, MISSOURI, ASSIGNOR OF ONE-HALF TO ADELBERT SCHNEIDER, OF SAME PLACE.

DEVICE FOR CLEANING BOTTLES OR SIMILAR RECEPTACLES.

SPECIFICATION forming part of Letters Patent No. 481,537, dated August 23, 1892.

Application filed March 15, 1892. Serial No. 425,056. (No model.)

*To all whom it may concern:*

Be it known that I, CHARLES F. WOESSNER, of the city of St. Louis, State of Missouri, have invented certain new and useful Improvements in Devices for Cleaning Bottles or Similar Receptacles, of which the following is a full, clear, and exact description, reference being had to the accompanying drawings, forming a part hereof.

My invention relates to improvements in devices for cleaning bottles or similar receptacles; and it consists in the novel arrangement and combination of parts, as will be more fully hereinafter described, and designated in the claims.

In the drawings, Figure 1 is a side elevation of my complete invention, showing the same located within the bottle and in position for cleaning the same when a rotary motion is imparted thereto. Fig. 2 is an enlarged longitudinal section of my complete invention in its normal position. Fig. 3 is a plan view showing the rear or concave portion of the hinged sections carrying the tufts. Fig. 4 is an enlarged elevation showing the lower tuft and the shank and socket carrying the same, and Fig. 5 is a cross-section taken on the line $x\ x$ of Fig. 2.

The object of my invention is to construct a bottle-cleaner in such a manner that the same can be easily inserted through the neck of the bottle when the same is in its normal position or closed and when the cleaner is brought in contact with the bottom of said bottle the sections carrying the tufts will open, causing the said tufts to be brought in contact with all the surfaces desired to be cleaned.

Referring to the drawings, 1 represents a bottle of the ordinary construction, within which my invention is located, and, as shown in Fig. 1, in a position to be rotated within said bottle for cleansing the same.

2 represents a tube which is of sufficient length and dimensions in cross-section, one end of which terminates in the solid portion 3 and the decreased portion 4. The said decreased portion 4 is provided with external screw-threads which are adapted to fit into internal screw-threads formed in one end of the tube 5, which carries the various parts composing my invention. The said tube 5 may be of any length, the inner surface of which has four straight sides, which is adapted to form an opening in the form of a square, as shown in Fig. 5, which opening is adapted to loosely receive the square shank 6, carried by the socket 7. The socket 7 is provided with a tuft 8, which is brought in contact with the bottom of the bottle for cleaning that portion of the same and further operates to open up the device when said pressure is applied to said tuft.

9 represents a plate, which is secured to the tube 5 in any suitable and mechanical manner to the interior thereof, and a portion thereof projecting a suitable distance and providing means for attaching the remaining movable parts to the device. Located within the tube 5 and interposed between the plate 9 and the upper end of the shank 6 is a coil-spring 10, which causes the device to always assume the position as shown in Fig. 2, when not in use.

11 represents a concave plate which is made in three sections, the said sections being hinged together in a manner as clearly shown in the drawings. The said plate is provided with two short sections 12, each of which is movably attached to the plate 9 and the socket 7, respectively, whereby the shank 6 is prevented from moving entirely out of the tube 5, and further causes the tuft carried by the said sections to be brought in contact with the interior surface of the bottle when opened, as shown plainly in Fig. 1. The tufts 13, attached to the short sections 12, are a little longer than those carried by the intermediate section, and when the device is opened, all of the said tufts will come in contact with some portion of the bottle. However, I may construct the device somewhat differently from that shown, in which instance the tufts will be all the same length.

The tube 2 of the device is attached to a suitable machine for rotating the same within the bottle while the same is held thereon, applying a sufficient pressure against the bottle at the bottom thereof in order to depress the lower tuft 8 of the device, in which operation the plate 11 will assume the position as shown in Fig. 1, causing all of the tufts to be brought in contact with the interior surface of the bottle.

Having fully described my invention, what I claim is—

1. In a bottle-washer, the combination, with a tubular standard and an outwardly-yielding shank movable longitudinally in said standard, but fixed against independent lateral movement, of a plate carrying tufts and consisting of three sections pivotally connected together, the free ends of said plate being respectively pivotally connected with the standard and shank, substantially as and for the purpose set forth.

2. A bottle-washer consisting of a tube, such as 5, adapted to be movably attached to a rotating tube or pipe 2, a shank, such as 6, adapted to be moved within said tube 5, a tuft carried by the lower end of the said shank and adapted to be brought in contact with the bottom of the bottle, a sectionalized plate, the sections of which are hinged together, one end of which is attached to the tube 5 and the other end attached to the socket carried by the shank 6, whereby the tufts carried by the said plates are brought in contact with the sides of the bottle when pressure is applied to the said tuft 8, substantially as described.

3. A bottle-washer consisting of a tube, such as 5, a plate 9, carried thereby, a square opening formed in the said tube, a square shank, such as 6, adapted to be located within said opening, a socket, such as 7, attached to one end of the said shank, a tuft secured within said socket, a sectionalized concave plate the sections of which are hinged together, one end of which is movably attached to the projecting end of the plate 9 and the opposite end movably attached to the said socket 7, and tufts carried by the said sectionalized plate and adapted to be brought in contact with the sides of the bottle when pressure is applied by the bottle to the said tuft 8, substantially as described.

4. A bottle-washer comprising a tube, such as 5, a plate, such as 9, attached thereto, a shank 6, adapted to be located within said tube, a tuft carried by the said shank, a coil-spring located between said plate and the upper end of the said shank, and a sectionalized plate, such as 11, the ends of which are movably attached to the plate 9 and the shank 6, respectively, whereby the tufts carried by the said sectionalized plate are brought in contact with the sides of the bottle when pressure is applied to the tuft carried by the said shank, substantially as described.

In testimony whereof I affix my signature in presence of two witnesses.

CHARLES F. WOESSNER.

Witnesses:
E. E. LONGAN,
ALFRED A. EICKS.